United States Patent [19]
Katsuma

[11] Patent Number: 5,575,672
[45] Date of Patent: Nov. 19, 1996

[54] LEVER CONNECTOR WITH CONCAVE-CONVEX ENGAGEMENT MECHANISM FOR HOLDING A LOCKING LEVER AT A LOCK POSITION

[75] Inventor: Takatoshi Katsuma, Mie, Japan

[73] Assignee: Sumitomo Wiring Systems, Ltd., Mie, Japan

[21] Appl. No.: 356,961

[22] Filed: Dec. 16, 1994

[30] Foreign Application Priority Data

| Dec. 17, 1993 | [JP] | Japan | 5-344458 |
| Mar. 29, 1994 | [JP] | Japan | 6-084051 |
| Apr. 7, 1994 | [JP] | Japan | 6-095804 |

[51] Int. Cl.⁶ ............................................. H01R 13/62
[52] U.S. Cl. .................................... 439/157; 439/160
[58] Field of Search ................................ 439/152–160, 439/372

[56] References Cited

U.S. PATENT DOCUMENTS

| 5,135,410 | 8/1992 | Kawase et al. | 439/372 |
| 5,230,639 | 7/1993 | Takenouchi et al. | 439/157 |
| 5,344,194 | 9/1994 | Hatagishi et al. | 439/157 |
| 5,401,179 | 5/1995 | Shinchi et al. | 439/157 |

FOREIGN PATENT DOCUMENTS

5-90843  12/1993  Japan.
5-90845  12/1993  Japan.

*Primary Examiner*—David L. Pirlot
*Assistant Examiner*—Brian J. Biggi
*Attorney, Agent, or Firm*—Wenderoth, Lind & Ponack

[57] ABSTRACT

A lever connector includes a connector housing having interfitting engagement with a counterpart connector housing. The connector housings accommodate a plurality of terminals. A locking lever is mounted on the connector housing so as to be displaced between a lock position where the connector housing and the counterpart connector housing interfit each other and a release position where the counterpart connector housing is disengaged from the connector housing. When the connector housing is engaged with the counterpart connector housing, the locking lever is laterally displaced from the release position to the lock position. A concavo-convex engagement mechanism includes a concave or convex member formed on the connector housing and a convex or concave member formed on the locking lever. The concave and the convex members are engaged with each other and the connector housing and the locking lever locked only when the locking lever assumes the lock position, so that the connector housing and the locking lever are locked. A lock control mechanism allows the concavo-convex engagement mechanism to lock the connector housing and the locking lever when the locking lever is abutting against the counterpart connector housing.

15 Claims, 11 Drawing Sheets

LEVER CONNECTOR WITH CONCAVE-CONVEX ENGAGEMENT MECHANISM FOR HOLDING A LOCKING LEVER AT A LOCK POSITION

BACKGROUND OF THE INVENTION

1. Field of the Invention

This invention relates to a lever connector having a locking lever for locking a counterpart connector, and more particularly to such a lever connector in which the locking lever is held in a lock position by a concavo-convex engagement mechanism.

2. Description of the Prior Art

Figure 14:
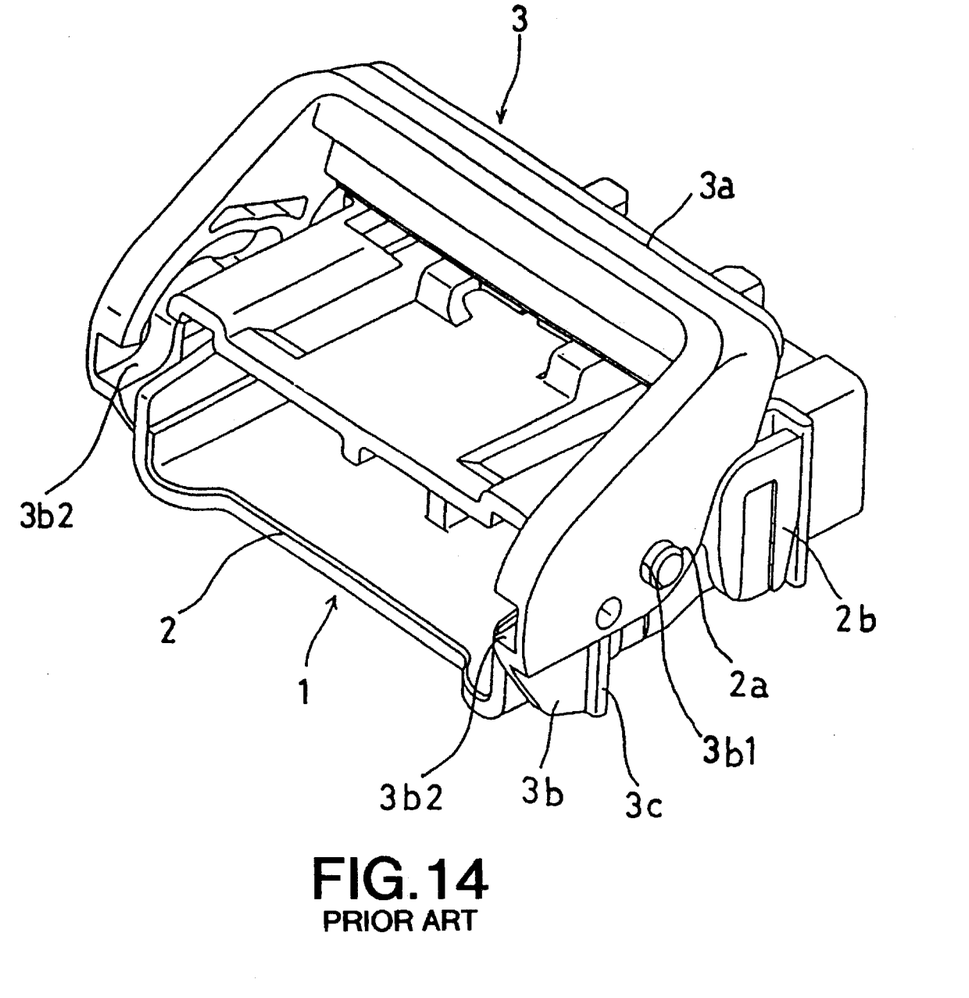
FIG. 14 is a perspective view of a prior art lever connector.

Japanese Unexamined Published Utility Model Registration Application No. 5-90845 discloses a lever connector of the above-described type. Referring to FIG. 14, illustrating the disclosed lever connector, a female connector housing 1 includes a flattened cylindrical hood 2 into which a male connector housing is inserted for interfitting engagement of the connectors. The hood 2 has two shafts 2a projecting from opposite side walls thereof. A generally U-shaped locking lever 3 includes a base 3a and two arms 3b extending from both ends of the base 3a by 90 degrees respectively. The locking lever 3 first straddles the hood 2 and the shafts 2a are then inserted into bearing holes 3b1 formed through the arms 3a, respectively, so that the locking lever 3 is rotatably mounted on the hood 2.

The inner face of each arm 3 has a groove 3b2. Protrusions formed on the male connector housing are guided into the grooves 3b2 and the locking lever 3 is then rotatively moved so that the male connector housing is further guided along the grooves 3b2 into the hood 2. An outer face of each arm 3 further has radially extending strip-like projections 3c. Upon rotative movement of the locking lever 3, the arms 3b are rotatively moved with the bearing holes 3b1 serving as fulcrums. After having been rotatively moved into a lock position so that the male connector housing has been completely enclosed by the hood 2, the projections 3c are substantially parallel to the direction in which the male connector housing is inserted into the open end of the hood.

On the other hand, the hood 2 has two locking arms 2b formed on opposite side walls thereof respectively. The locking arms 2b cover the respective projections 3c when the locking lever 3 has been rotatively moved such that the projections 3c are parallel to the longitudinal axis of the hood 2. Each locking arm 2b has a claw formed on an inner face which is engageable with the projection 3c. Accordingly, as the male connector housing is drawn into the hood 2 upon the rotative movement of the locking lever 3, the projections 3c of the locking lever 3 are engaged with the locking arms 2b when the locking lever 3 has assumed the final or lock position, whereupon the lever 3 is held at the lock position.

In the above-described lever connector, however, during transport of the male connectors external forces such as vibrations can sometimes cause the locking lever 3 to rotate into the lock position with the male connector housings not accommodated in the hoods, for example.

Accordingly, in the subsequent step of interfitting the connectors, the male connector housing can only be inserted into a female hood 2 only after the locking lever has been released from the lock position. Consequently, the working efficiency in the connector interfitting step is lowered.

SUMMARY OF THE INVENTION

An object of the present invention is to provide an electrical lever connector having a locking lever which can be effectively prevented from being inadvertently moved to a locked position.

To achieve the object, the present invention provides a lever connector assembly including a connector housing which is to be engaged with a housing of a counterpart connector. The respective housings accommodate a plurality of terminals therein. A locking lever is rotatably mounted on one of the connector housings so as to be rotatable between a lock position and a release position. The connector housing is engaged with the counterpart connector housing when the locking lever is displaced from the release position to the lock position. A concavo-convex engagement mechanism includes a concave or convex member provided on the connector housing and a convex or concave member provided on the locking lever. The concave and the convex members are engaged with each other when the locking lever assumes the lock position, thereby locking the locking lever on the connector housing. A lock control mechanism allows the members of the concavo-convex engagement mechanism to be relatively positioned so as to lock the connector housing and the locking lever together only when the locking lever is abutting against the counterpart connector housing.

In the above-described construction, the lock control mechanism prevents the locking lever and the connector housing from locking when the connector housing is disengaged from the counterpart connector housing. Alternatively, the lock control mechanism may prevent the locking lever from being rotated to a lock position when the connector housing is disengaged from the counterpart connector housing.

According to the above-described construction, the lock control mechanism prevents the concavo-convex engagement mechanism from locking the locking lever with the connector housing until the counterpart connector housing and the connector housing are interfitted together. Accordingly, the connector housing and the locking lever can be effectively prevented from being inadvertently engaged with each other prior to engagement with the counterpart connector housing. Consequently, a high level of working efficiency, during the step of interfitting the connector housings, can be maintained.

BRIEF DESCRIPTION OF THE DRAWINGS

Other objects, features and advantages of the present invention will become apparent upon reviewing the following description of the preferred embodiment thereof, made with reference to the accompanying drawings, in which.

DESCRIPTION OF THE PREFERRED EMBODIMENTS

Figure 1:
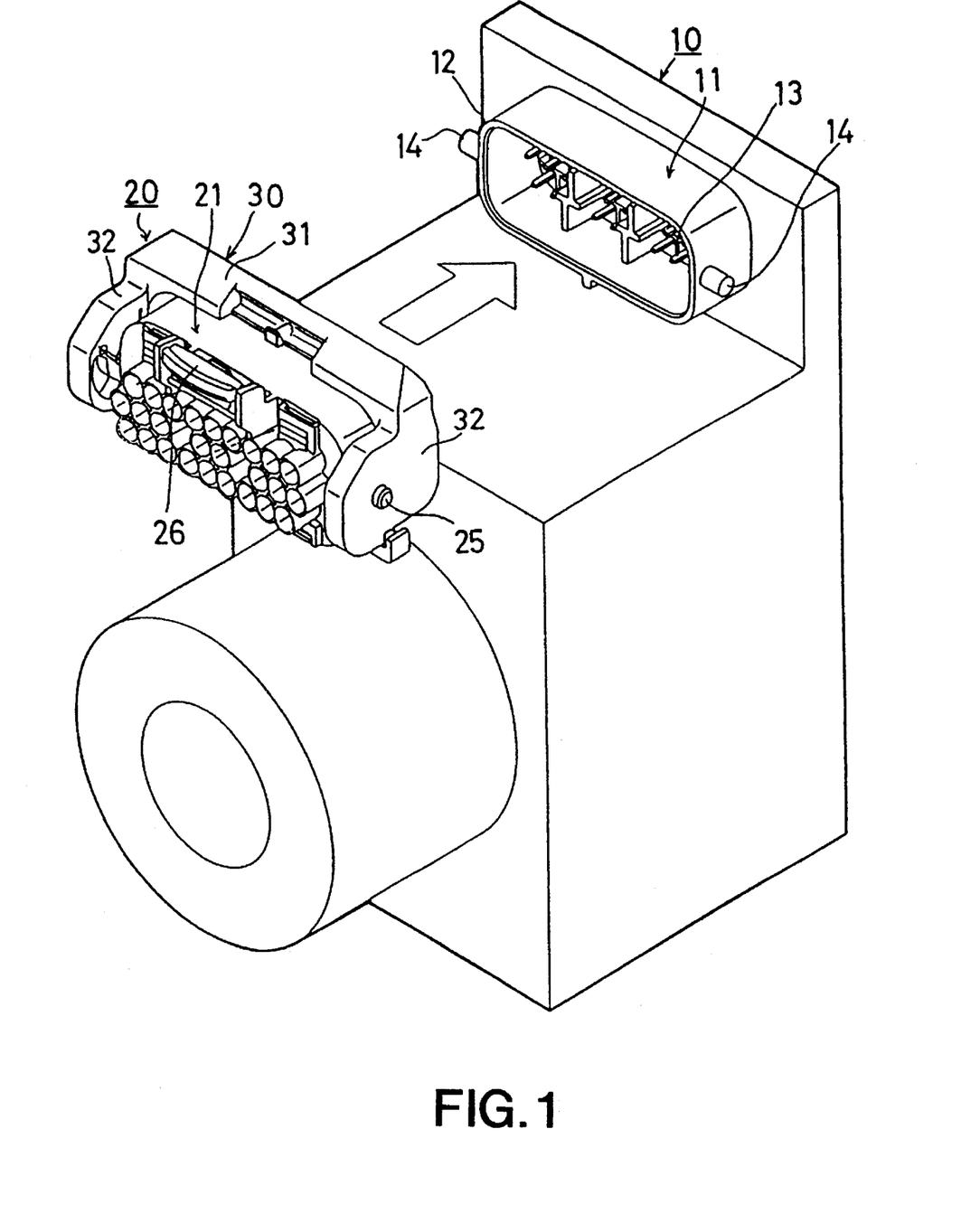
FIG. 1 is a perspective view of a first embodiment of an electrical lever connector in accordance with the present invention, together with a counterpart connector mounted on an electrical equipment casing.

A first embodiment of the present invention will be described with reference to FIGS. 1 to 5C. In the first embodiment, a lever connector 20 in accordance with the present invention is detachably mounted to a male connector housing 11 formed integrally on a casing 10 of a unit of electrical equipment, as shown in FIG. 1.

The male connector housing 11 includes a male side hood 12 formed into the shape of a flattened cylindrical member and projecting from one face of the casing 10. A plurality of male terminals or electrode terminals 13 are accommodated in the hood 12 so as to extend toward an open end of the same. A pair of short cylindrical projections 14 having respective axial centers collinear with each other are formed on opposite outer sides of the housing 11.

Figure 2:
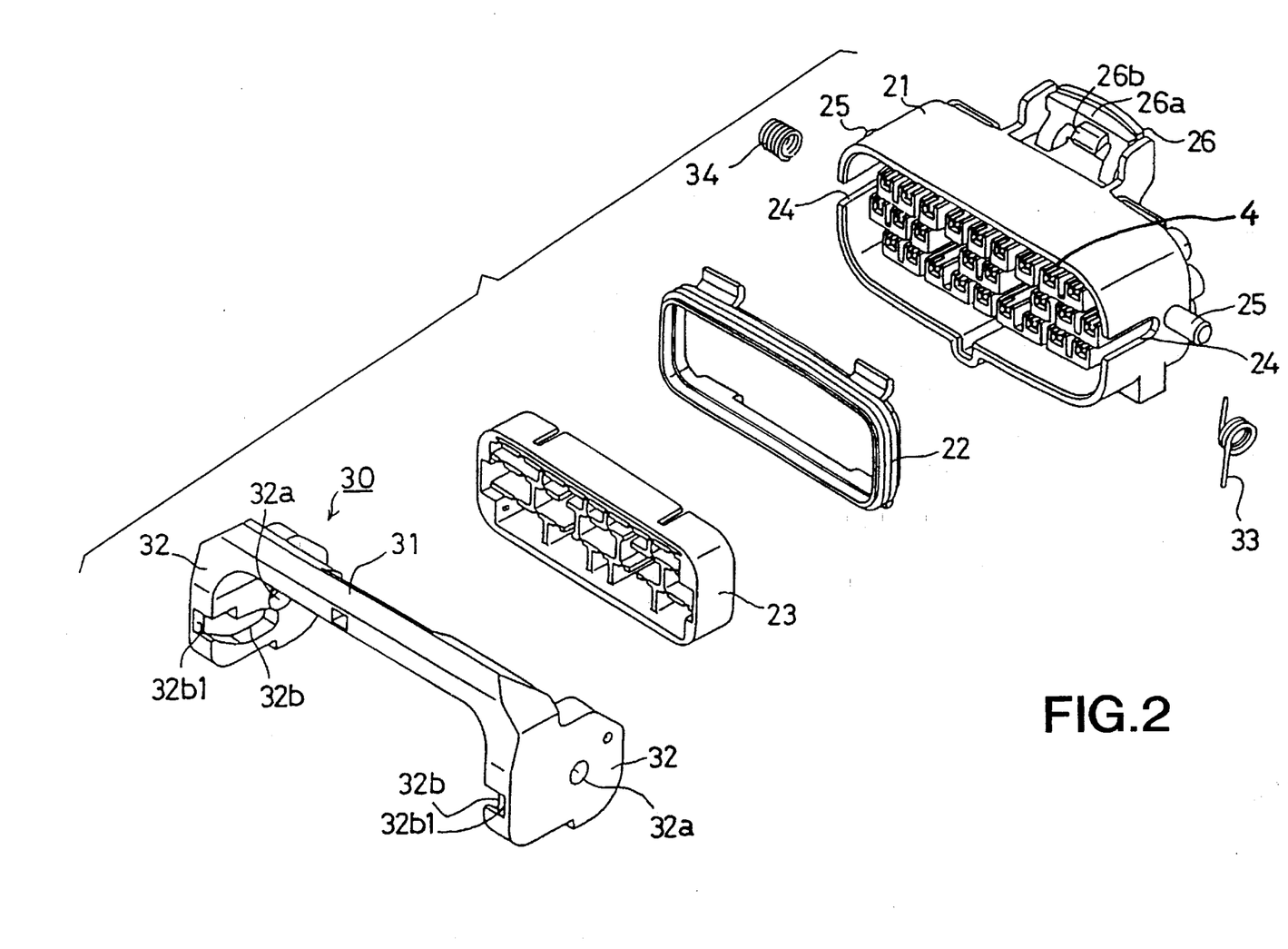
FIG. 2 is an exploded view of the lever connector.
Figure 3:
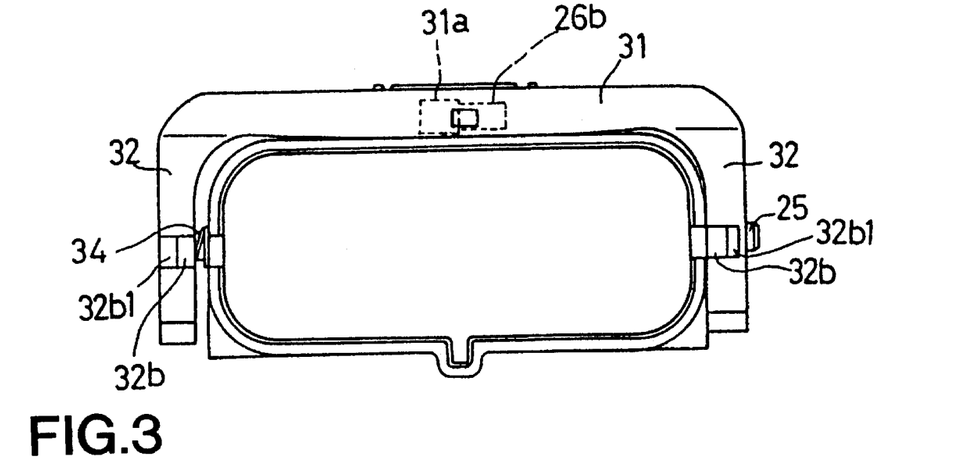
FIG. 3 is a front view of the lever connector.

Referring to FIG. 2, the lever connector 20 includes a housing 21 into which the hood 12 can be inserted. A plurality of female terminals 4 for receiving the respective male terminals 13 for electrical connection, are accommodated in the housing 21 and are directed toward an open end of the same. A ring-shaped sealing member 22 and a retainer 23 are attached to the open end of the housing 21 in turn, thereby providing a double securement for the female terminals.

The housing 21 has two notches 24 formed in opposite side walls and extending from an open housing edge toward the opposite side of the housing 21. The male projections 14 pass through the notches 24 respectively when the housing 21 is engaged with the male connector housing 11, as will be described later. A pair of projections 25, having respective collinear axial centers are formed on opposite side walls of the housing 21. The projections 25 are located in the vicinity of the terminal ends of the respective notches 24. The housing 21 further has a locking arm 26 extending from an upper edge of an end of the housing 21, opposite to the open end thereof, as viewed in FIG. 2. The locking arm 26 includes an upper operating portion 26a for engagement of a finger, and a locking claw 26b projecting from the operating portion 26a toward the open end of the housing 21. Since the locking arm 26 has a degree of elasticity, the locking claw 26b is slightly vertically displaceable.

Figure 5A:
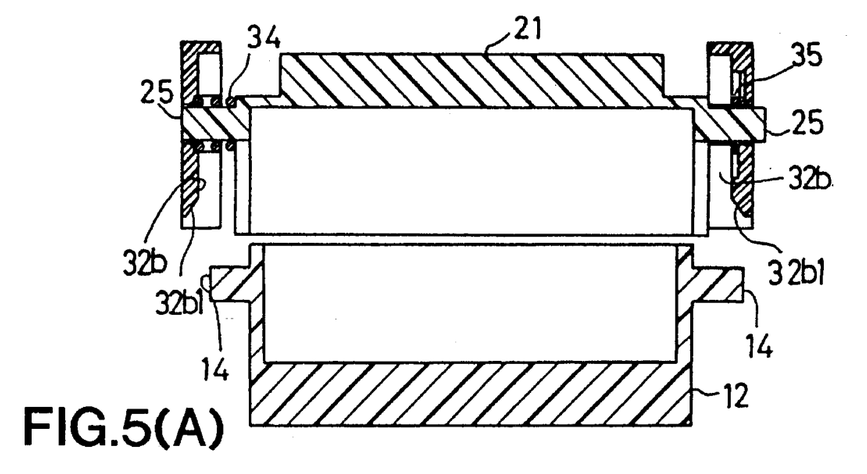
FIGS. 5A, 5B and 5C are sectional views of the lever connector and the counterpart connector.
Figure 5B:
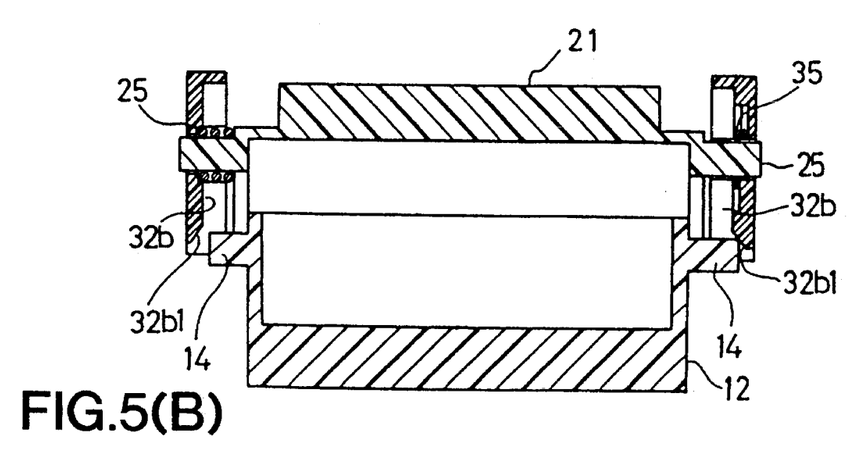
Figure 5C:
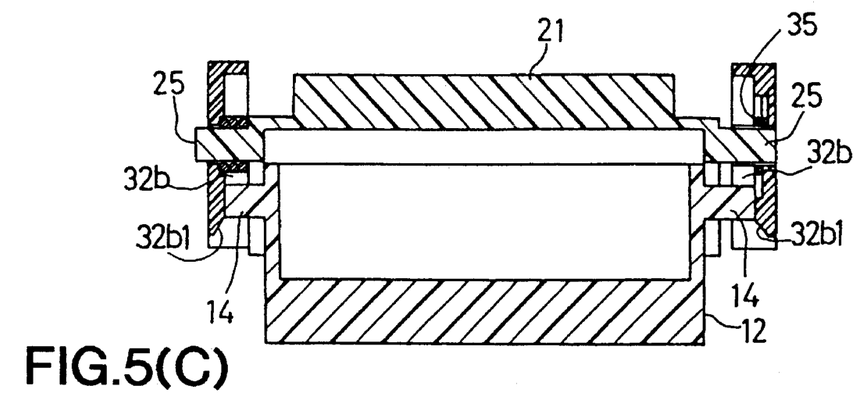
Figure 6:
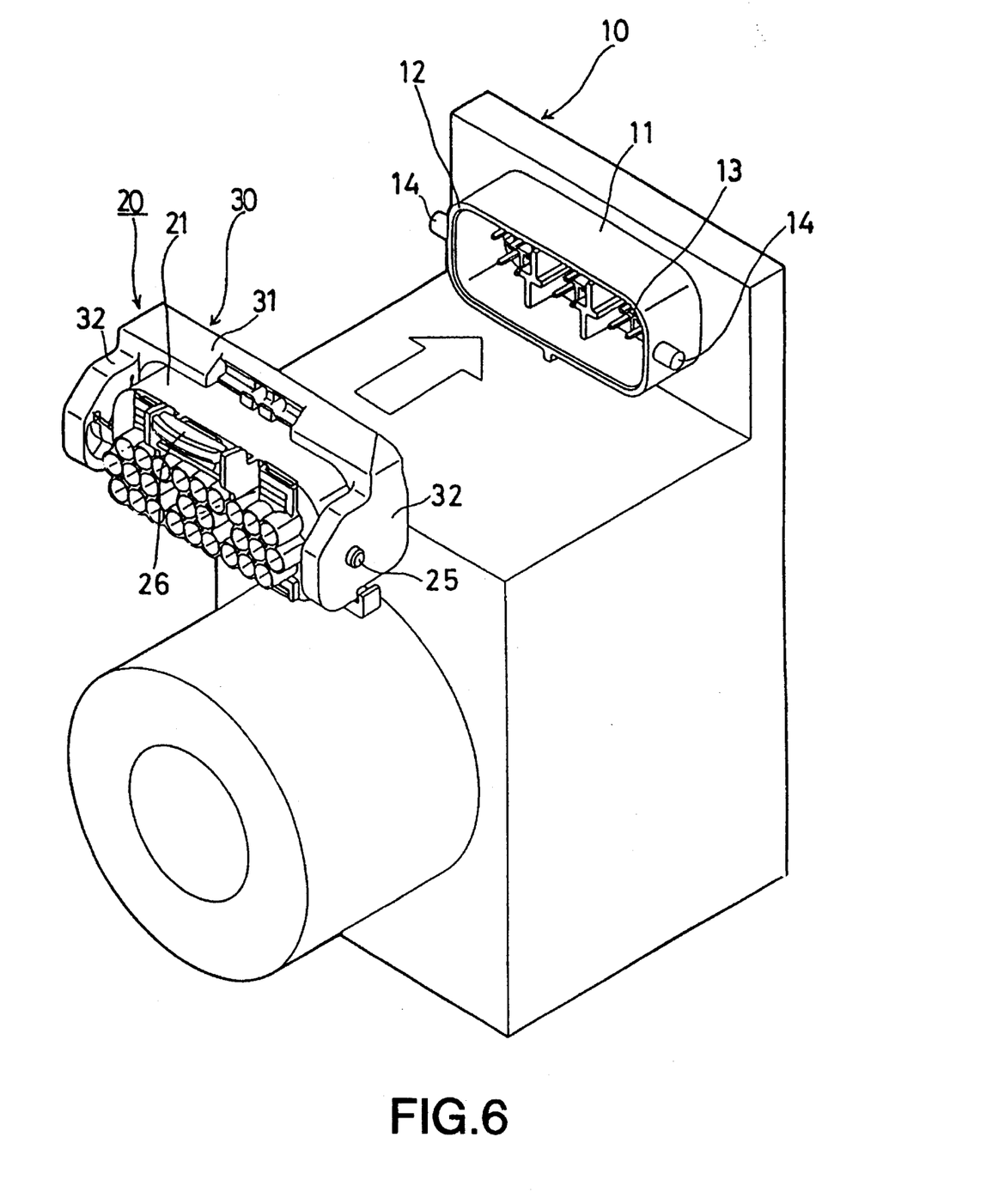
FIG. 6 is a view similar to FIG. 1, showing a second embodiment of an electrical lever connector in accordance with the present invention.
Figure 7:
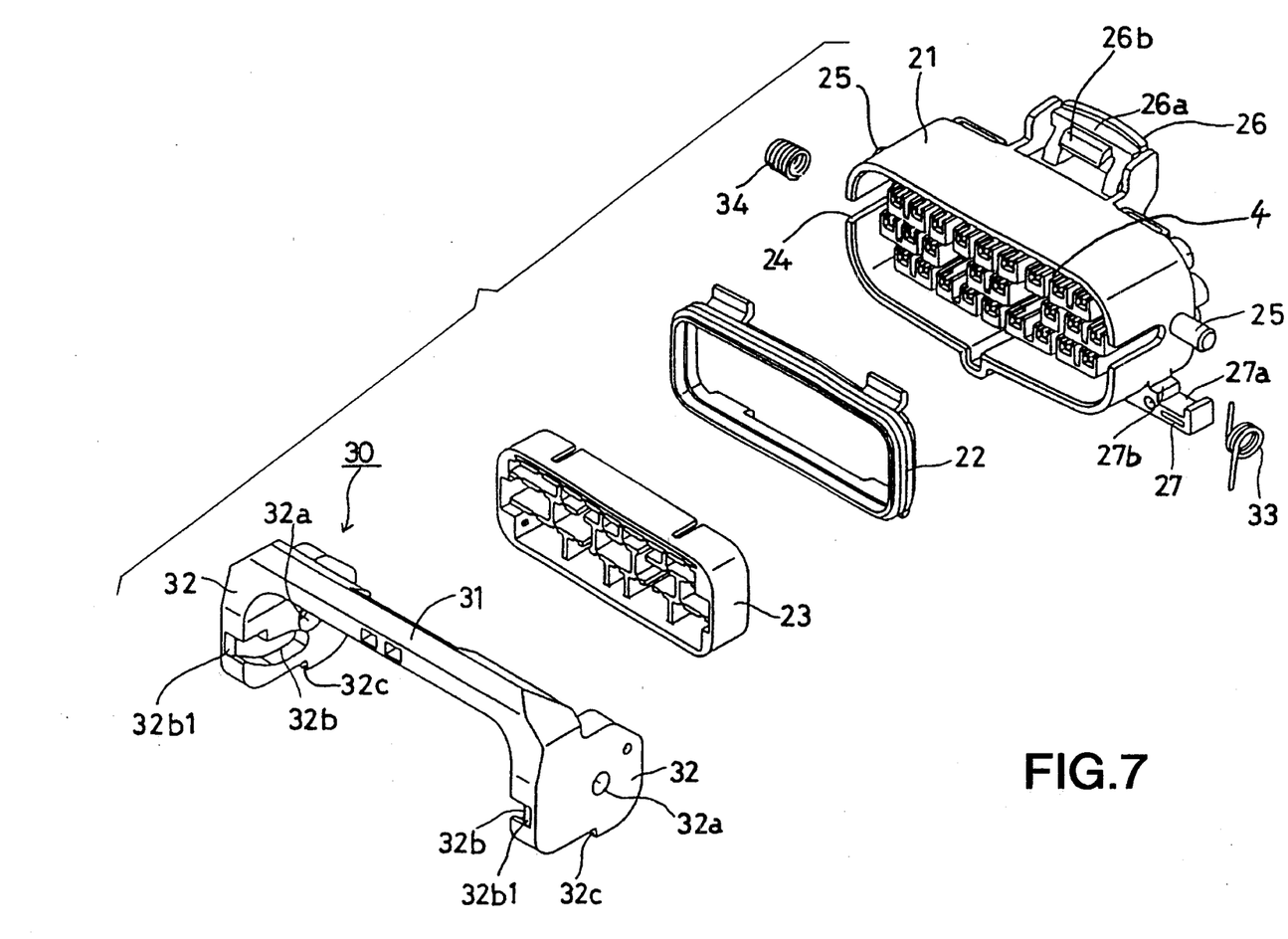
FIG. 7 is an exploded view of the lever connector according to the second embodiment.

The locking lever 30 includes a base 31 and two arms 32 extending from both ends of the base 31 at a right angle to the base 31 respectively. Each arm 32 has a bearing hole 32a formed through a central portion thereof. The projections 25 of the housing 21 are inserted into the bearing holes 32a respectively as will be described later. An inner face of each arm 32 includes a cam groove or recess 32b. Each groove 32b is open at the outer peripheral face of the arm 32 at one end and has an inclined face 32b1 extending inwardly from the open end. The distance between the inclined faces 32b1 is reduced as they extend inwardly, as shown in FIGS. 5A–5C.

Upon insertion of the projections 25 into grooves 32b, the arms 32 of the locking lever 30 are expanded until projections 25 are received in the respective bearing holes 32a, so that the locking lever 30 straddles the housing 21. Since the distance between the arms 32 of the locking lever 30 is slightly larger than the width of the housing 21, the locking lever 30 is rotatively movable about the projections 25 and slidable axially along the projections 25.

The diameter of each bearing hole 32a is larger at the inner side of the arm 32 than that of the projection 25. A torsion coil spring 33, through which the projection 25 is inserted, is provided in one of the bearing holes 32a. A coil spring 34, through which a projection 25 is inserted, is provided in the other bearing hole 32a. The torsion coil spring 33 is held at one of two ends thereof on the housing 21, and at the other end thereof on the arm 32 of the locking arm 30, whereupon the locking lever 30 is urged so that the openings of the cam grooves 32b are directed toward the open end of the housing 21. On the other hand, a lock control mechanism is provided by the coil spring 34 which has one end abutted against the outer wall of the housing 21 and the other end thereof abutted against the inner wall of the arm 32 of the locking lever 30, whereupon the locking lever 30 is urged to the left, in parallel to the longitudinal axis of the projections 25, as viewed in FIG. 3. Consequently, the locking lever 30 is displaceable to the right by a distance corresponding to a resultant gap.

The locking lever 30 has an engagement claw 31a formed on approximately the central portion of the base 31 opposite to the open end of the housing 21. The engagement claw 31a is engageable with the locking claw 26b of the locking arm 26. The engagement claw 31a is moved widthwise or laterally when the locking lever 30 is displaced axially along the longitudinal axis of projections 25. The engagement claw 31a cannot engage the locking claw 26b when the locking lever 30 has been displaced to the left. However, it is allowed to engage the locking claw 26b when the locking lever 30 has been displaced to the right. The locking lever 30 assumes a release position when the openings of the cam grooves 32b are directed to the open end of the housing 21 by the torsion coil spring 33. The locking lever 30 assumes a lock position when it is laterally moved to a position where it can rotate so that the engagement claw 31a is engageable with the locking claw 26b. The engagement claw 31a and the locking arm 26 constitute a concavo-convex engagement mechanism including concavo-convex members which are further constituted by the engagement claw 31a and the locking claw 26b.

Figure 4A:
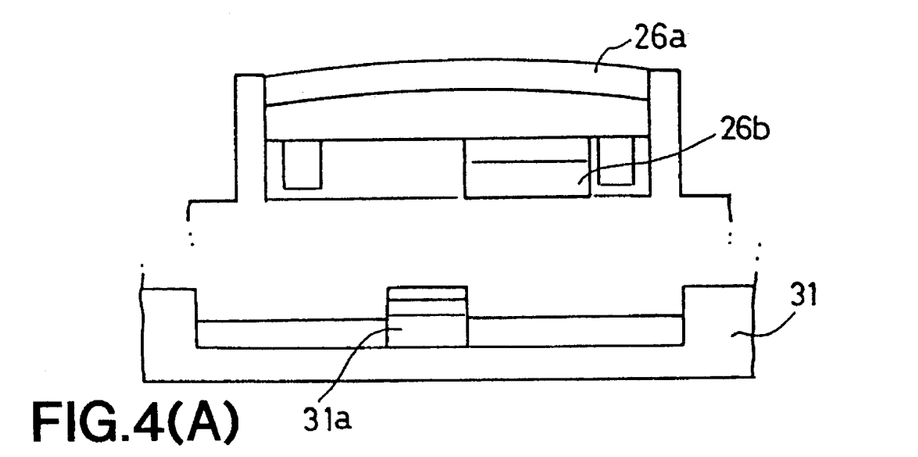
FIGS. 4A and 4B are partially enlarged plan views of the lever connector.

The operation of the above construction will now be described. The locking lever 30 is urged by the coil spring 34 to the left relative to the housing 21 when the lever connector 20 is disengaged from the male connector housing 11, as viewed in FIG. 3. In this condition, the engagement claw 31a cannot engage the locking claw 26b, as shown in FIG. 4A. Accordingly, even when an external force, produced during transportation of the lever connector 20, causes the locking lever 30 to rotatively move to the lock position against the torsion coil spring 33, the engagement claw 31a will not engage the locking claw 26b. Thereafter, the torsion coil spring 34 returns the engagement claw 31a to the former release position upon removal of the external force. Consequently, the locking lever 30 can be prevented from being held in a locked position prior to the lever connector 20 being interfitted with the male connector mounted on the casing 10 of the electrical equipment.

On the other hand, when fitted with the male connector mounted on the casing 10, the lever connector 20 is positioned so as to face the male connector housing 11, as shown in FIG. 5A. Since the locking lever 30 is biased to the left of the housing 21, the engagement claw 31a and the locking claw 26b do not engage each other, as shown in FIG. 4A. However, when the male connector housing 11 is inserted into the female housing 21, the projections 14 of the male connector housing 11 are guided into the notches 24 of the housing 21 by inclined faces 32b1 into the cam grooves 32b formed in the arms 32 located outside the notches 24, respectively. Since the inclined faces 32b1 are formed in the open ends of the cam grooves 32b, the distal end of the right-hand projection 14 engages the inclined face 32b1 of the right-hand arm 32 so that the locking lever 30 is drawn to the right, as shown in FIG. 5B.

The locking lever 30 is then rotated to the lock position when both projections 14 have entered the openings of the cam grooves 32b respectively as shown in FIG. 5C. The projections 14 are then guided along the grooves 32b toward the bearing holes 32a, respectively. As the projections 14 are drawn along the respective grooves 32b, the locking lever 30 is rotatively moved with the bearing holes 32a serving as the fulcrums. Accordingly, since the cam grooves 32b draw the respective projections 14 and 25 together by leverage, the connectors can be fitted with each other with only minimal force.

Figure 4B:
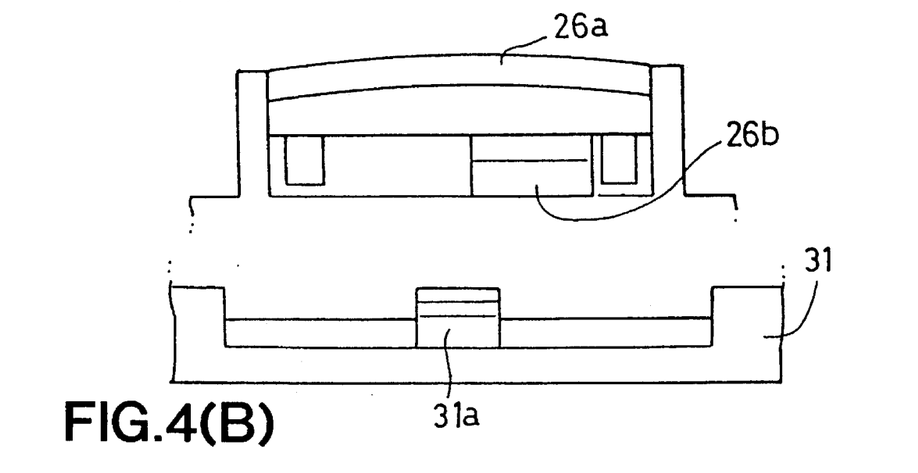

The locking lever 30 has already been displaced to the right before rotating to the lock position. Once in this position, the engagement claw 31a is engageable with the locking claw 26b as shown in FIG. 4B. Accordingly, when the locking lever 30 is thrust against the locking arm 26, the engagement claw 31a engages the locking claw 26b so that the locking lever 30 is held in the lock position.

According to the above-described construction, the locking lever 30 is laterally displaced relative to the connector housing 21 when the projections 14, formed on the male connector housing 11, are abutted against the inclined faces 32b1 of the cam grooves 32b of the locking lever 30. Consequently, the engagement claw 31a, forming part of the concavo-convex engagement mechanism, assumes the position where it is engageable with the locking claw 26b also forming part of the concavo-convex engagement mechanism. Thus, when the connector housing 21 is not in engagement with the male connector housing 11, the engagement claw 31a is not allowed to engage the locking claw 26b upon rotation of the locking lever 30. However, the engagement claw 31a is engaged with the locking claw 26b when the connectors are fitted together, so that the locking lever 30 serves as a locking mechanism.

Although the locking lever 30 in the foregoing embodiment is displaced so that the engagement claw 31a can engage the locking claw 26b, the locking claw 26b at the side of the housing 21 may be displaced, instead. For this purpose, a displaceable abutment piece is provided in the innermost interior of the housing 21. The abutment piece has at one end a claw serving as the above-described locking claw 26b. The male connector housing 11 abuts against the abutment piece when being fitted into the housing 21, thereby displacing the abutment piece. As the result of displacement of the abutment piece, a locking claw formed on the other end of the abutment piece assumes the position where it is engageable with the engagement claw 31a.

Although the concavo-convex engagement mechanism is provided on the base 31 of the locking lever 30 in the foregoing embodiment, it may be provided on each arm of the locking lever as in the prior art lever connector. Furthermore, although the locking lever 30 is operated so that the counterpart connector is drawn into the connector by cam action, the locking lever may have a locking mechanism engaging the fitted counterpart connector for preventing the counterpart connector from falling out, instead. Additionally, although the torsion coil spring 33 and the coil spring 34 are used in the above-described lever connector, a single spring may be employed which performs the functions of the separate springs.

FIGS. 6 to 9B illustrate a second embodiment of the present invention. The identical parts are labeled by the same reference numerals as those in the first embodiment.

Figure 8:
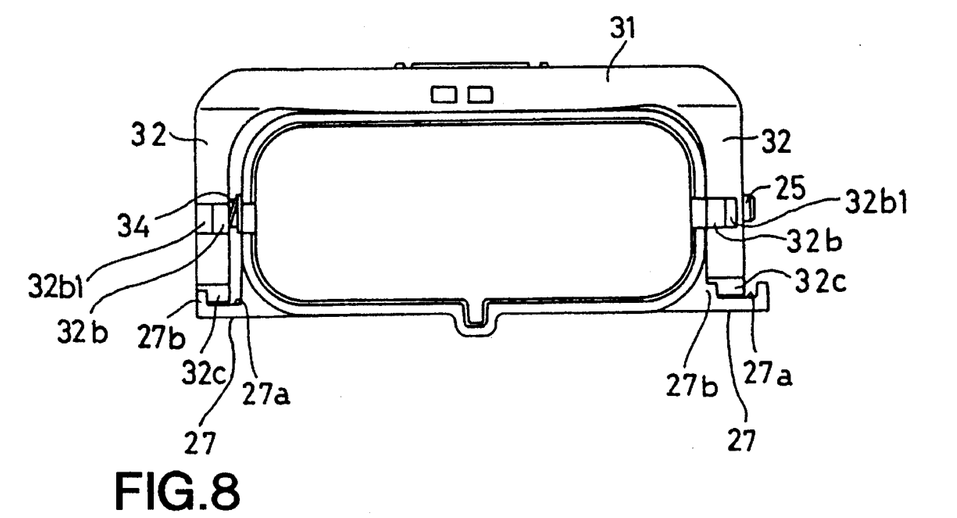
FIG. 8 is a front view of the lever connector according to the second embodiment.
Figure 9A:
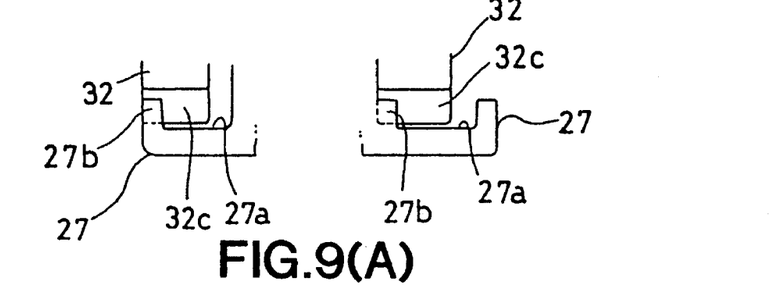
FIGS. 9A and 9B are partially enlarged front views of a locking lever, showing the engagement and disengagement of stopper faces with respective engagement convexities.
Figure 9B:
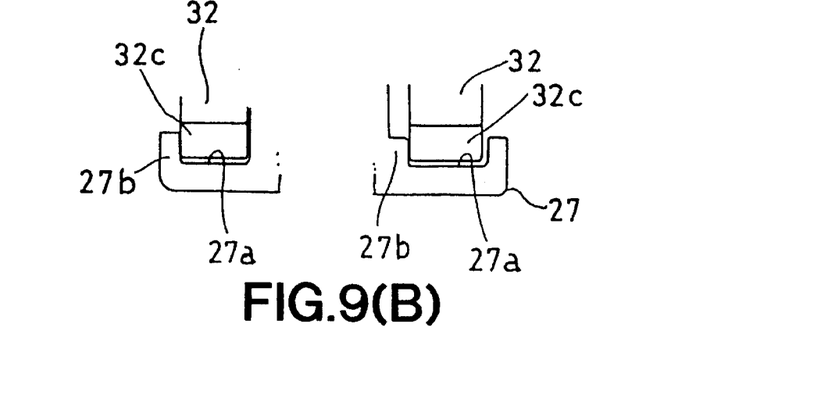
Figure 10:
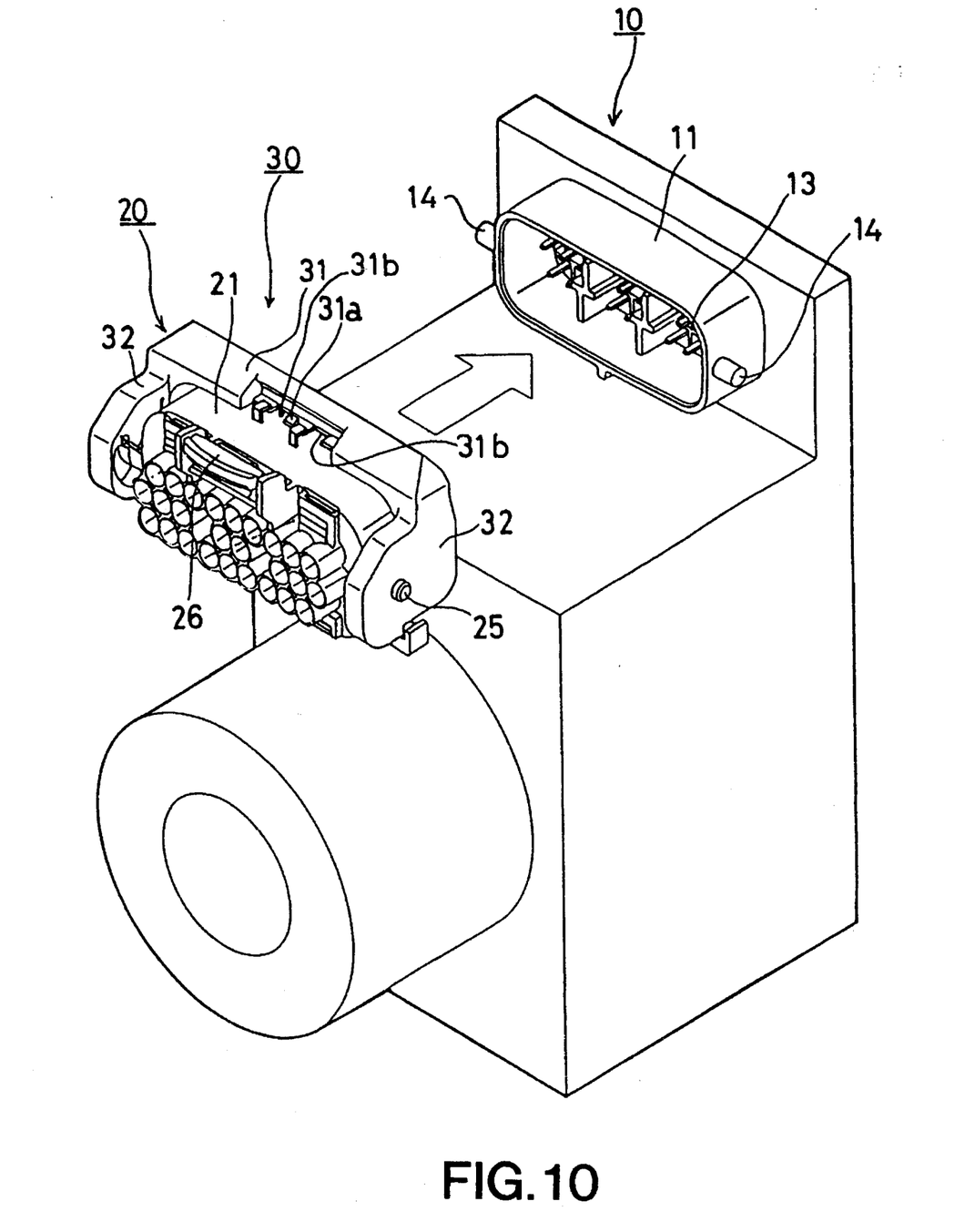
FIG. 10 is a view similar to FIG. 1, showing a third embodiment of an electrical lever connector in accordance with the present invention.
Figure 11:
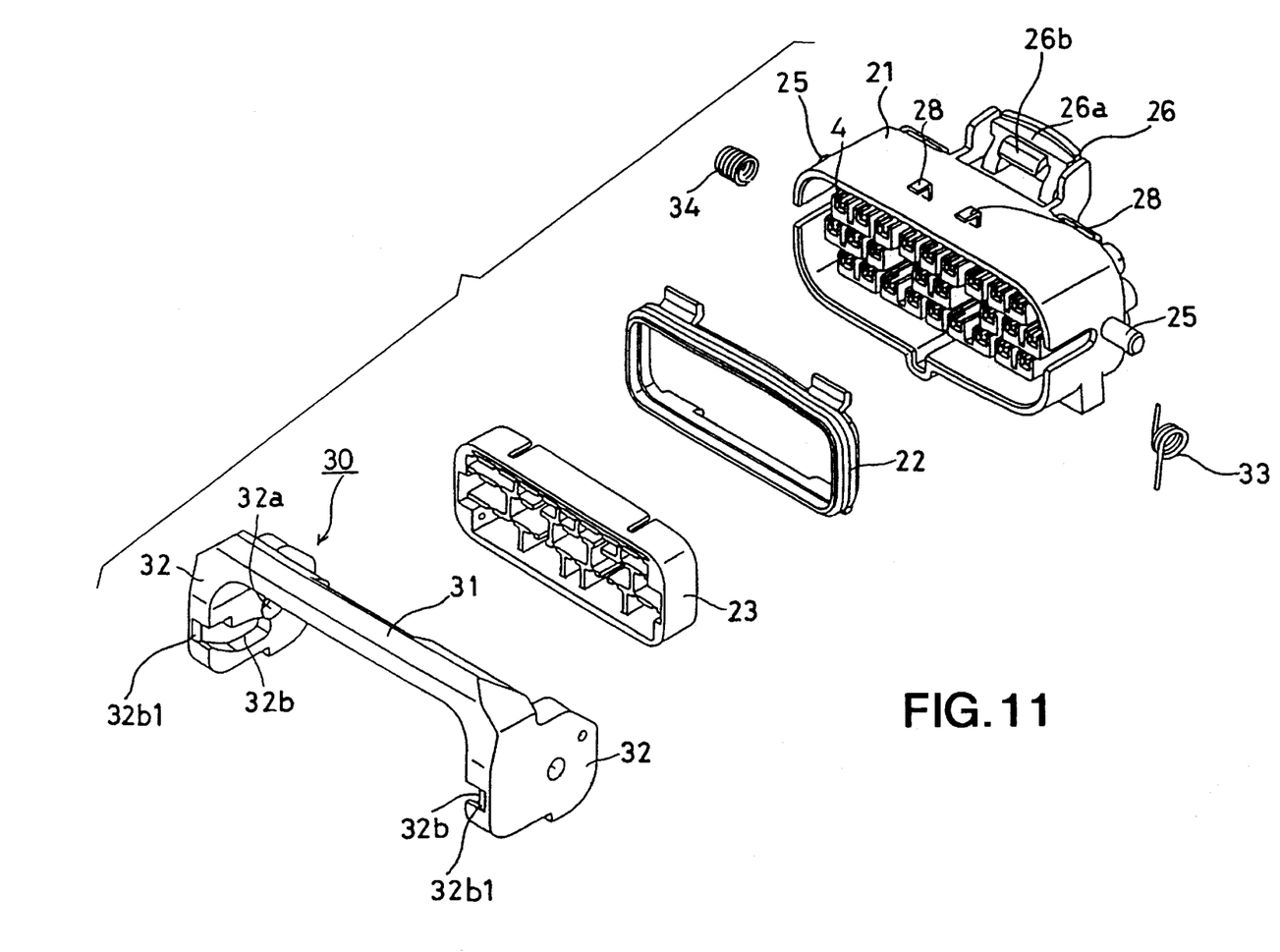
FIG. 11 is an exploded view of the lever connector according to the third embodiment.

The female connector housing 21 has two protrusions 27 horizontally projecting from the central lower edges of the opposite side walls thereof. Each protrusion 27 has in its outer face a groove 27a whose width is slightly larger than the thickness of each arm 32 of the locking lever 30. After the locking lever 30 is released from a non-rotary or initial position, the arms 32 of the locking lever 30 are allowed to pass through the grooves 27a respectively so that the rotary movement of the locking lever 30 is allowed. The arms 32 of the locking lever 30 have respective stopper faces 32c formed on the lower ends thereof, as shown in FIGS. 8, 9A and 9B. The left-hand groove 27a has an outer projecting edge 27b while the right-hand groove 27a has an inner projecting edge 27b, as viewed in FIGS. 8, 9A and 9B. When these projecting edges 27b are engaged with the stopper faces 32C respectively, rotational movement of the locking lever 30 is prevented and the lever is held in the initial position.

The operation of the above construction will now be described. The locking lever 30 is urged to the left by the coil spring 34 when the female connector is separate from the male connector, as viewed in FIGS. 8, 9A and 9B. Accordingly, the stopper faces 32c of the locking lever 30 are in engagement with the projecting edges 27b respectively, as shown in FIG. 9A. The locking lever 30 is held in the non-rotary position, so that the locking lever 30 can be prevented from inadvertently engaging the locking arm 26 when the female connector is disengaged from the male connector.

On the other hand, the locking lever 30 is gradually displaced to the right against the coil spring 34 in the during interfitting engagement of the housings 11 and 21, as shown in FIG. 9B. Accordingly, the stopper faces 32c of the locking lever 30 are disengaged from the respective projecting edges 27b, and the lower ends of the arms 32 are aligned with the respective grooves 27a. Rotation of the locking lever 30 is allowed in this position. Subsequently, both connector housings 11 and 21 are locked together when the engagement claw 31a of the locking lever 30 engages the locking claw 26b of the female connector housing 21.

According to the above-described construction, the locking lever 30 can be prevented from inadvertently assuming the lock position when the female connector is disengaged from the male connector. Thus, the locking lever 30 is held in the normal or initial position until the connectors 11 and 21 are interfit. Accordingly, due to the above-described construction, the engagement of connectors 11 and 21 can be smoothly performed. Furthermore, the locking lever 30 is automatically moved to a rotary position as the projections 14 are guided along the respective inclined faces 32b. Consequently, smooth interfitting of the housings can be anticipated.

FIGS. 10 to 13 illustrate a third embodiment of the present invention. Rotational movement of the locking lever 30 is prevented by two inverted L-shaped engagement protrusions 28 which are provided on the female connector housing 21. In the third embodiment, rotational movement of the looking lever 30 is controlled by two notches 31b formed in the base 31 and the two engagement protrusions 28 on the female connector housing 21.

Figures 12, 13A:
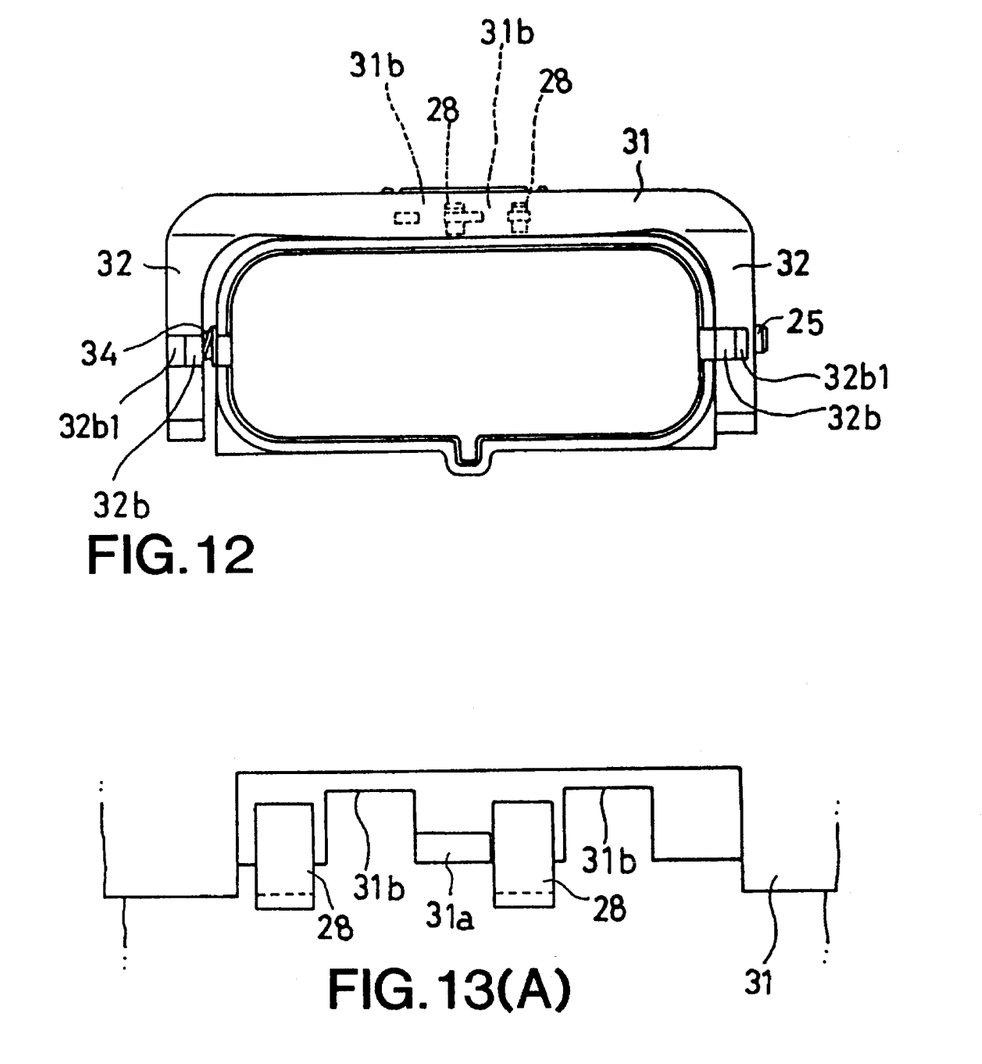
FIG. 12 is a front view of the lever connector according to the third embodiment.
FIGS. 13A and 13B are partially enlarged plan views of a locking lever, showing the engagement and disengagement of a locking lever with the counterpart connector housing.

The engagement claw 31a engaged with the locking claw 26b of the locking arm 26 is formed on the central portion of the base 31 of the locking lever 30, as described above. Both sides of the engagement claw 31a are cut out so that the notches 31b are formed, as best shown in FIG. 13A and 13B.

Figure 13B:
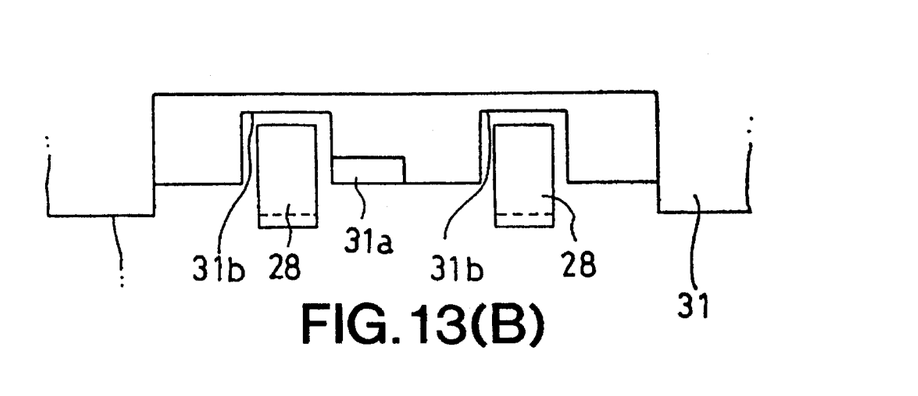

The above-mentioned inverted L-shaped engagement protrusions 28 has at an upper end a bent portion which is narrower than the width of notches 31b, as shown in FIG. 13B. As the locking lever 30 is displaced axially of the projections 25, the relative positions of the engagement protrusions 28 and the respective notches 31b are varied as shown in FIGS. 13A and 13B.

The base 31 of the locking lever 30 is rotated upwardly over the upper face of the female connector housing 21 when the locking lever is rotated upon interfitting engagement of the male and female connector housings 11 and 21. Accordingly, the locking lever 30 can be rotated when the upper ends of the engagement protrusions 28 align with the notches 31b as shown in FIG. 13B. However, when not aligned with the notches 31b, the upper ends of the engagement protrusions 28 will engage the unnotched portions, so that rotaton of the locking lever 30 is prevented, as shown in FIG. 13A.

In the third embodiment, before the interfitting engagement of the connectors, the upper ends of the engagement protrusions 28 are aligned with the unnotched portions of the base 31 by the action of the coil spring 34, so that inadvertent rotation of the locking lever 30 can be prevented. During the interfitting engagement of the connectors, the locking lever 30 is displaced in the same manner as in the foregoing embodiments so that the upper ends of the engagement protrusions 28 are aligned with the respective notches 31b, whereupon the locking lever 30 can be rotated.

The arms 32 of the locking lever 30 extend from both ends of the base 31 at a right angle to the base. To maintain each arm 32 at an angle of 90 degrees relative to the base 31 is difficult, as each arm 32 tends to curve inwardly. The stopper faces 32c of the arms 32 abut against the projecting edges 27b of the protrusions 27 in the above-described second embodiment. To ensure the function of the stopper faces 32c, a high level of angular accuracy relative to the base 31 is required of the arms 32. In the third embodiment, however, the base 31 of the locking lever 30 is held via the arms 32 on the female connector housing 21. Accordingly, an angular error between the base 31 and each arm 32 does not affect the functioning of the locking structure. Consequently, the engagement protrusions 28 can reliably engage with and disengage from the respective notches 31b even when the accuracy in the forming of the arms 32 is not at a high level.

Although shifting means is provided for automatically releasing the locking lever 30 from the locked state in the third embodiment, the lever may be manually displaced. Furthermore, in the third embodiment, the torsion coil spring 33 urges the locking lever in a direction to permit it to return. However, since inadvertent rotative movement of the locking lever 30 is reliably prevented before the interfitting engagement of the connectors, the torsion coil spring 33 may be eliminated. Additionally, although the locking arm 26 is provided on the female connector housing 21 in the third embodiment, the locking lever 30 may be engaged with the male connector housing so that the connectors are held in the state of interfitting engagement. Furthermore, the locking lever 30 may be mounted on the male connector housing 11 and the projections 14 may be formed on the female connector housing 21.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A connector assembly comprising:

a first connector housing;

a second connector housing engageable with said first connector housing;

a locking lever rotatably mounted on said first connector housing;

a pair of cam grooves formed on said locking lever, each groove having an open end in a peripheral surface of said locking lever;

a pair of projections extending from opposite sides of said second connector housing and engageable with said cam grooves;

a concavo-convex engagement mechanism including a concave or convex member provided on said locking lever and a convex or concave member provided on said first connector housing; and a lock control mechanism provided between said first connector housing and said locking lever to laterally move said locking lever relative to said first connector housing for preventing said concave or convex member on said locking lever from engaging said convex or concave member on said first connector housing until said first connector housing is engaged with said second connector housing.

2. The connector assembly as claimed in claim 1, further comprising abutment means provided at said open end of said cam grooves for engaging said projections on said second connector housing upon coupling of said first and second connector housings.

3. The connector assembly as claimed in claim 1, further comprising:

a pair of through holes provided in said locking lever;

a pair of collinear mounting shafts projecting from opposite sides of said first connector housing and engaging said bearing holes to allow rotation and lateral displacement of said locking lever along said mounting shafts, wherein said lock control mechanism comprises a spring provided on one of said pair of mounting shafts and between said first connector housing and said locking lever, said spring biases said locking lever laterally to one side of said first connector housing so that said concave or convex member on said locking lever can not engage said convex or concave member on said first connector housing.

4. The connector assembly as claimed in claim 3, further comprising inwardly tapering surfaces at said open end of said cam grooves for engaging said projections on said second connector housing and laterally shifting said locking lever upon coupling of said first and second connector housings against the bias of said spring, wherein said concave or convex member on said locking lever can engage said convex or concave member on said first connector housing upon rotation of said locking lever.

5. The connector assembly as claimed in claim 3, further comprising:

a stopper formed on said locking lever; and a projection extending from said first connector housing and aligned with said stopper face prior to engagement of said first connector housing with said second connector housing.

6. The connector assembly as claimed in claim 5, further comprising:

an inwardly tapering surface at said open ends of said cam grooves for engaging said projections on said second connector housing and laterally shifting said locking lever upon coupling of said first and second connector housings against the bias of said spring, wherein said stopper face is shifted out of alignment with said projection thereby permitting rotational movement of said locking lever and engagement of said first locking member on said locking lever with said second locking member on said first connector housing.

7. The connector assembly as claimed in claim 5, wherein said locking lever is U-shape and includes a base having opposite ends, and two arms depending from said opposite ends, wherein said arms straddle said first connector housing and said stopper is formed on said base of said locking lever.

8. The connector assembly as claimed in claim 5, wherein said locking lever is U-shape and includes a base having opposite ends, and an arm depending from each of said opposite ends of said base, wherein said arms straddle said first connector housing and said stopper is formed on at least one of said arms remote from said base of said locking lever.

9. A connector assembly comprising:

a first connector housing accommodating a plurality of terminals;

a pair of collinear mounting shafts located on opposite sides of said first connector housing;

a second connector housing engageable with said first connector housing and accommodating a plurality of terminals corresponding to said plurality of terminals accommodated in said first connector housing;

a pair of collinear projections located on opposite sides of said second connector housing;

a U-shaped locking lever rotatably mounted on said first connector housing, said locking lever having a base having opposite ends and an arm depending from each end of said base;

a through hole, in each said locking lever arm, receiving said mounting shafts, wherein said locking lever is rotatable about said mounting shafts and moveable laterally of said first connector housing along said mounting shafts;

a cam groove, in an inner surface of each of said locking lever arms, having an open end through a peripheral surface of each said arm;

a concave or convex member provided on said locking lever; and a convex or concave member provided on said first connector housing and engageable with said concave or convex member provided on said locking lever to lock said locking lever relative to said first connector housing when said lever is laterally moved from a normal position where said members are not aligned to a lock position where said members are aligned.

10. The lever connector assembly as claimed in claim 9, further comprising a spring positioned on one of said mounting shafts between said locking lever and said first connector housing.

11. The lever connector assembly as claimed in claim 9, further comprising an inwardly tapering surface at said open end of each of said cam grooves, wherein said locking lever is moved laterally relative to said first connector housing upon engagement of said collinear projections of said second connector housing with said inwardly tapering surfaces.

12. A connector assembly comprising:

a first connector housing accommodating a plurality of terminals;

a pair of collinear mounting shafts located on opposite sides of said first connector housing;

a second connector housing engageable with said first connector housing and accommodating a plurality of terminals corresponding to said plurality of terminals accommodated in said first connector housing;

a pair of collinear projections located on opposite sides of said second connector housing;

a U-shaped locking lever rotatably mounted on said first connector housing, said locking lever having a base having opposite ends and an arm depending from each end of said base;

a through hole, in each said locking lever arm, receiving said mounting shafts, wherein said locking lever is rotatable about said mounting shafts and moveable laterally of said first connector housing along said mounting shafts from a non-rotatable position to a rotary position;

a cam groove, in an inner surface of each of said locking lever arms, having an open end through a peripheral surface of each said arm;

at least one projection on said first connector housing and a stopper on said locking lever, wherein said stopper is positioned to engage said at least one projection and prevent rotation of said locking lever when said first connector housing is disengaged from said second connector housing and said locking lever is in said non-rotatable position.

13. The lever connector assembly as claimed in claim 12, further comprising a spring positioned on one of said mounting shafts between said locking lever and said first connector housing.

14. The lever connector assembly as claimed in claim 13, further comprising an inwardly tapering surface at said open end of each of said cam grooves, wherein said locking lever is moved laterally relative to said first connector housing upon engagement of said collinear projections of said second connector housing with said inwardly tapering surfaces.

15. The lever connector assembly as claimed in claim 12, further comprising:

a concave or convex member provided on said locking lever; and a convex or concave member provided on said first connector housing and engageable with said concave or convex member provided on said locking lever to lock said locking lever relative to said first connector housing when said lever is laterally moved from said non-rotatable position to said lock position and rotated.

* * * * *